INVENTORS:
CHARLES C. LEACH
RALPH L. WILLIAMS
BY Bedell and Burgess
ATTORNEYS

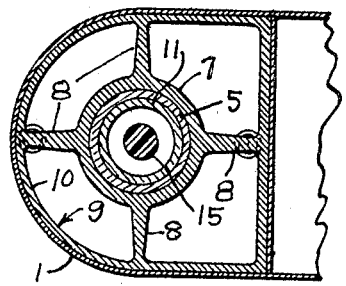
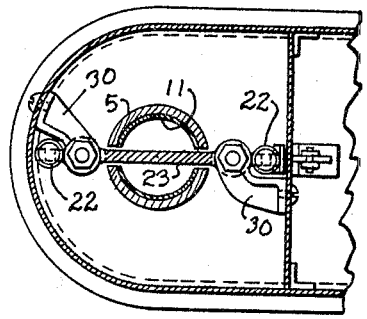
Fig. 8.    Fig. 9.
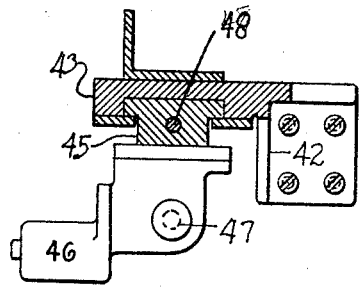
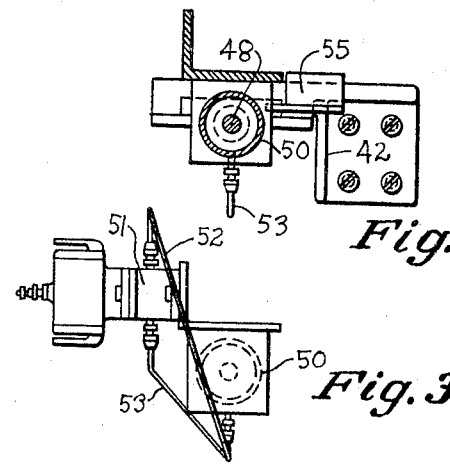
Fig. 5.    Fig. 4.
Fig. 3.
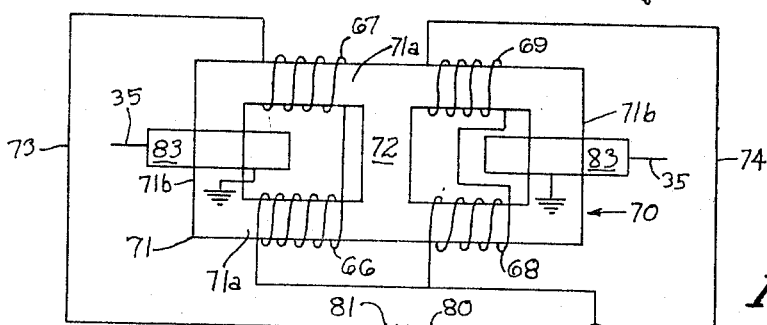
Fig. 10.
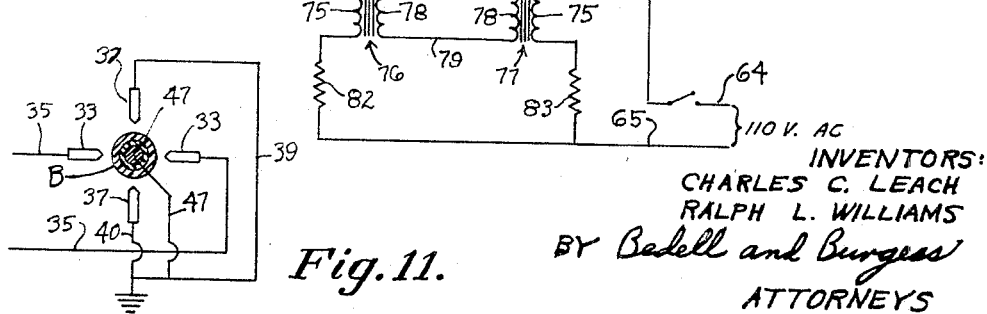
Fig. 11.

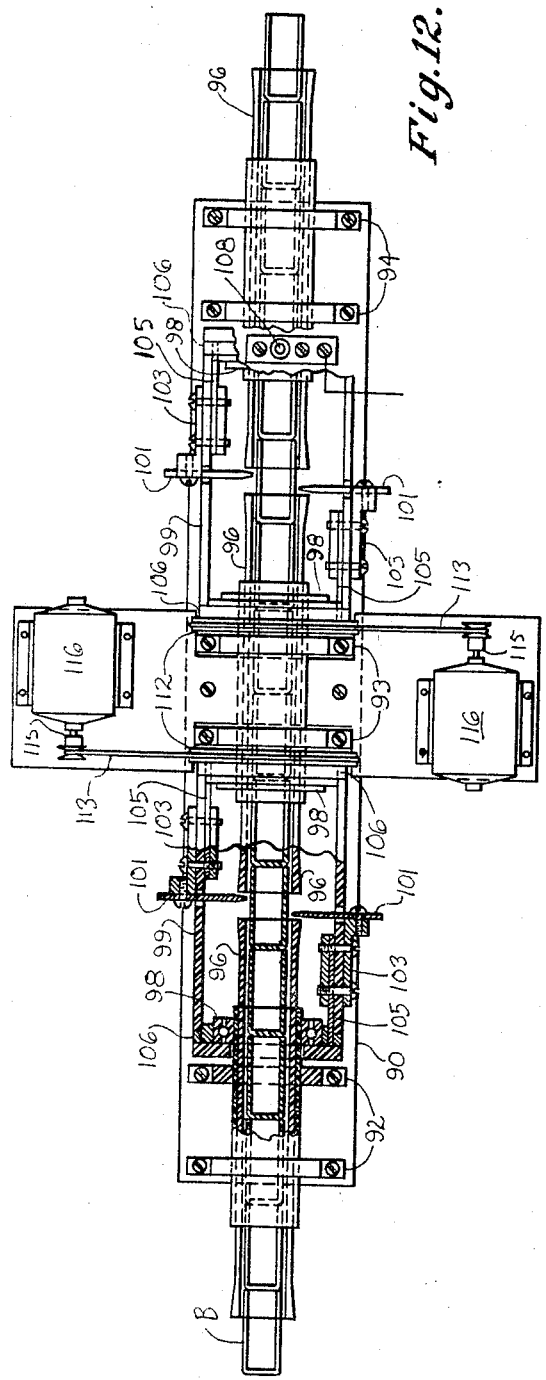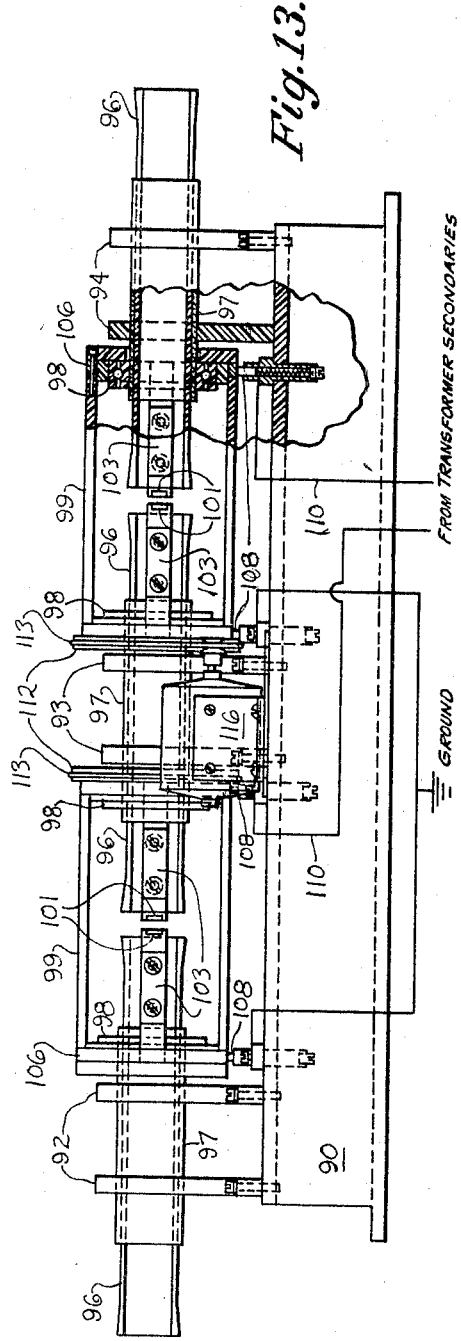

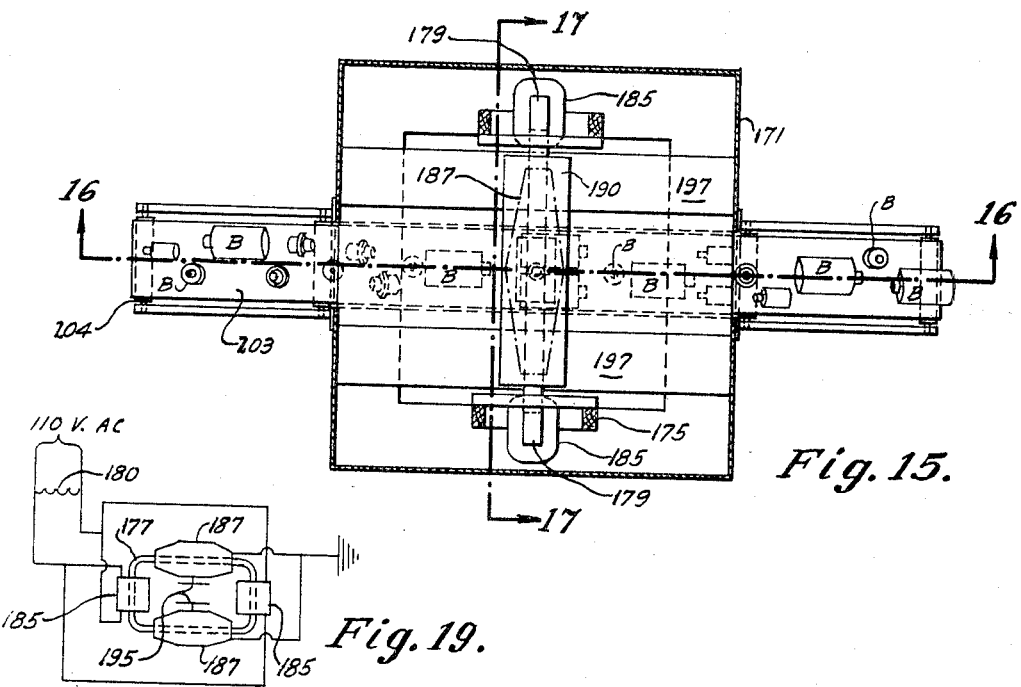
Fig. 15.
Fig. 19.
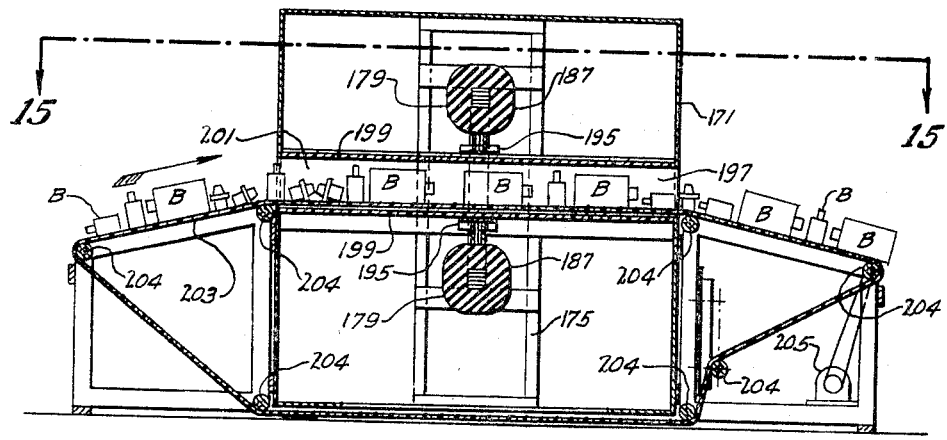
Fig. 16.
INVENTORS—
CHARLES C. LEACH AND
RALPH L. WILLIAMS
BY- Bedell & Burgess
ATTORNEYS.

INVENTORS—
CHARLES C. LEACH AND
RALPH L. WILLIAMS
BY— Bedell & Burgess
ATTORNEYS.

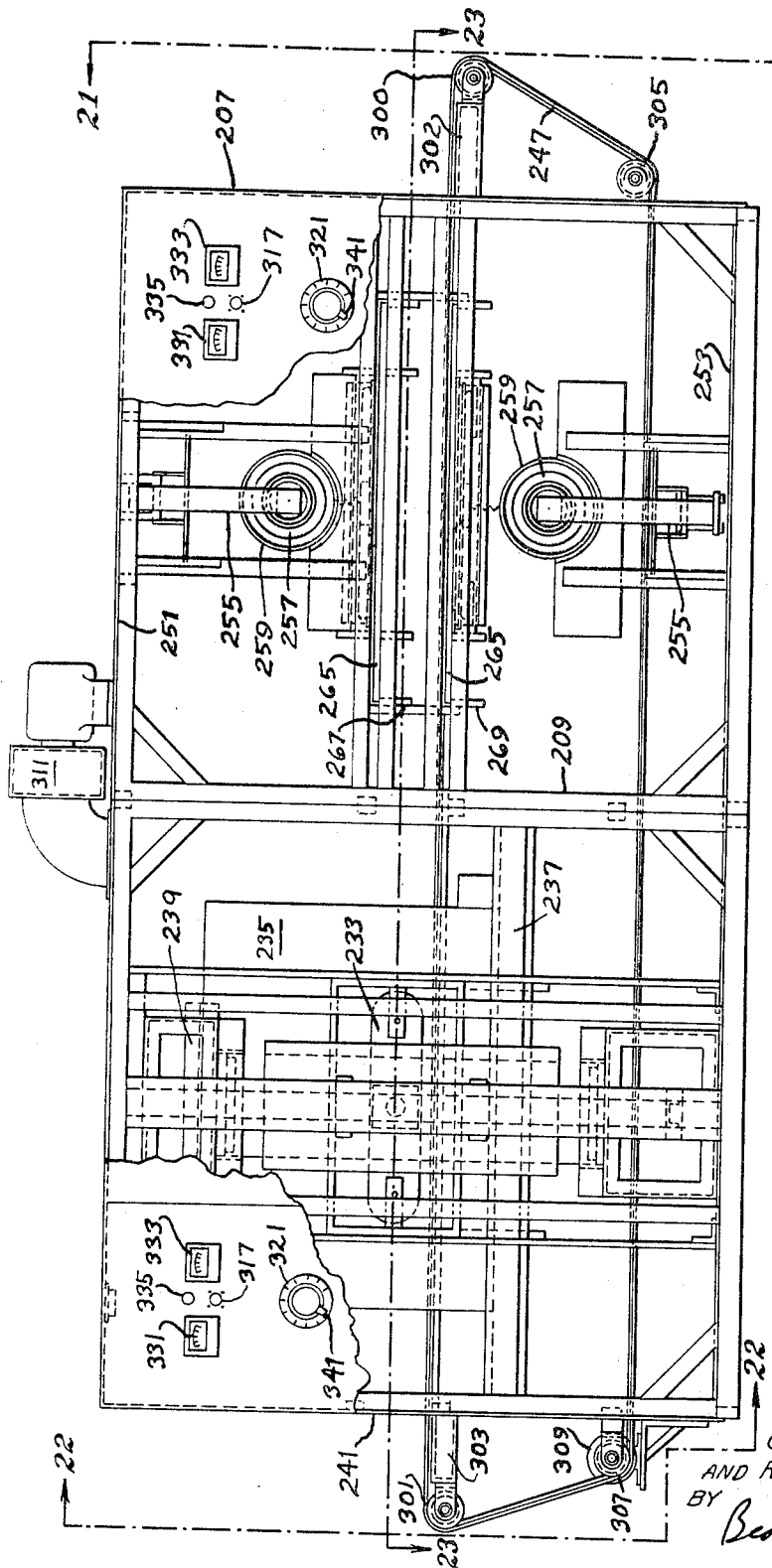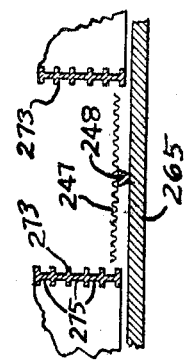

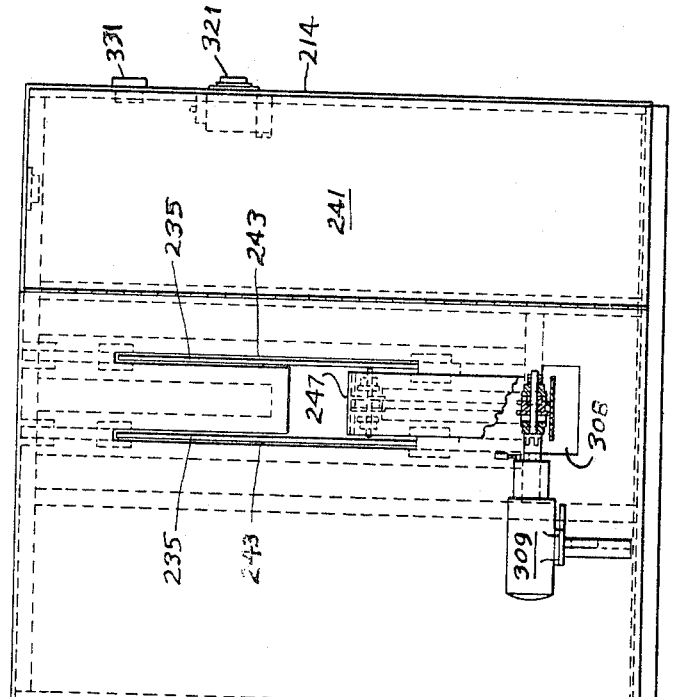
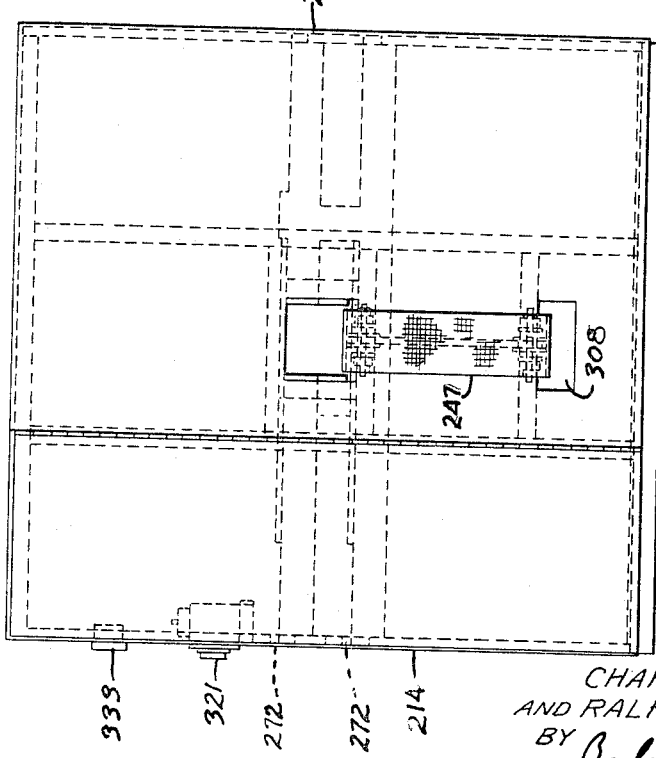

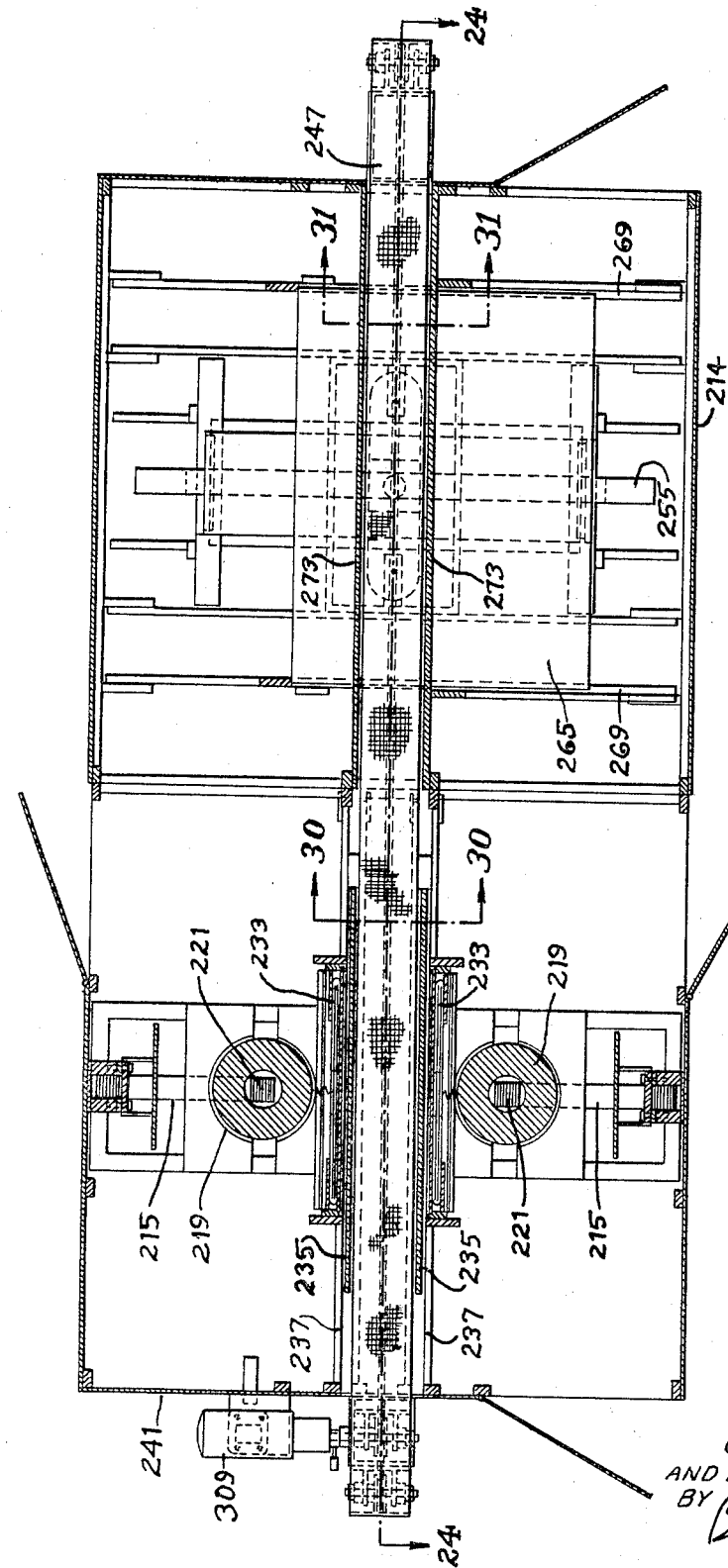
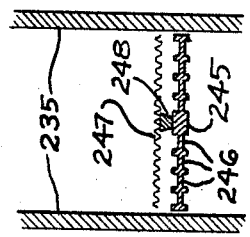

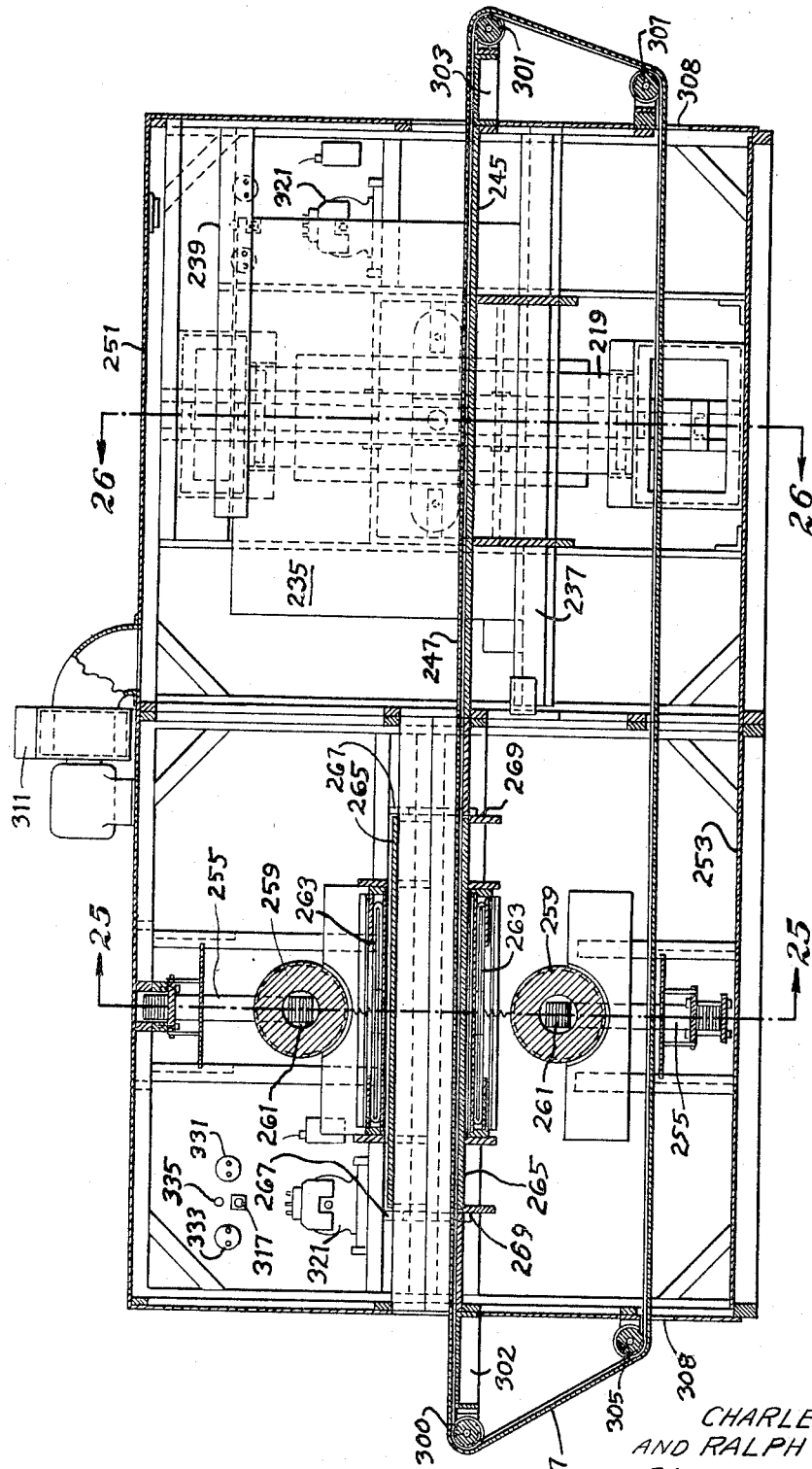

INVENTORS
CHARLES C. LEACH
AND RALPH L. WILLIAMS
BY Bedell & Burgess
ATTORNEYS.

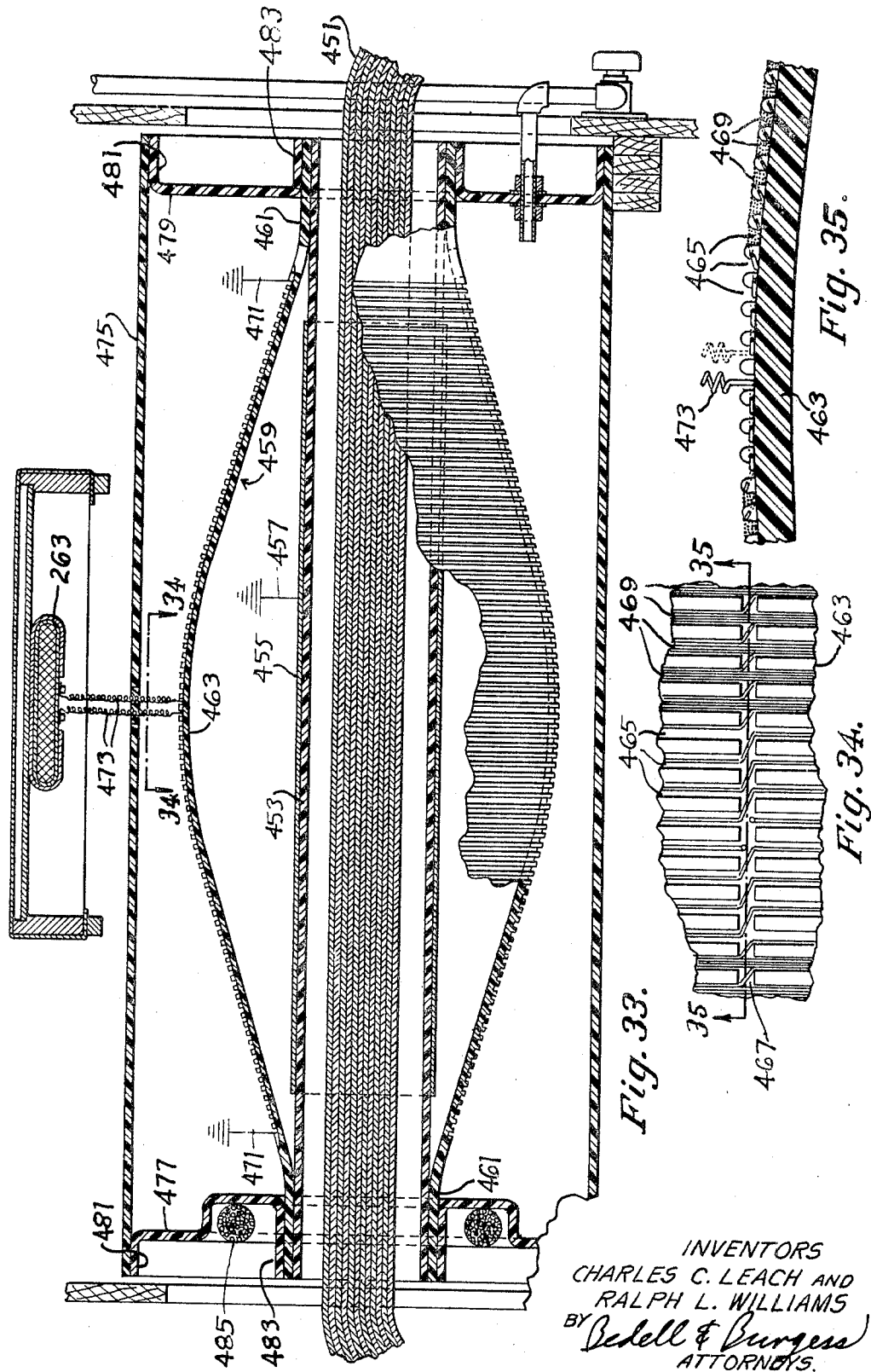

United States Patent Office 3,428,801
Patented Feb. 18, 1969

3,428,801
APPARATUS FOR TREATING THE SURFACE OF PLASTIC BOTTLES WITH AN ELECTRICAL SPARK DISCHARGE
Charles Christopher Leach, University City, and Ralph Lee Williams, Maplewood, Mo., assignors, by direct and mesne assignments, to Ralph L. Williams, doing business as Lectro Engineering Company, St. Louis, Mo.
Continuation of application Ser. No. 377,461, June 19, 1964. This application Feb. 16, 1966, Ser. No. 541,868
U.S. Cl. 250—49.5
Int. Cl. H01j 37/20, 37/30
26 Claims The invention relates to a method and apparatus for treating organic plastic objects, particularly bottles, to improve the adhesive properties of their surfaces.

This application is a continuation of our copending application Ser. No. 377,461, filed June 19, 1964, which is a continuation-in-part of our application Ser. No. 125,466, filed July 20, 1961. Both of these applications have been abandoned.

Most organic plastic materials have extremely low adherency to and compatibility with inks and adhesives, as a result of which printed legends easily rub off and labels will not remain attached to the bottles. Numerous means including chemical, electrical and radiant treatments have been tried without any great degree of success, the chemical treatments requiring extensive equipment and substantial expenditures of time and money. Known electrical methods, most of which have involved the use of a corona discharge, have been inadequate to treat large thick-walled objects as distinguished from the plastic film. The radiant method consists of subjecting the plastic surface to a gas flame and is dangerous, difficult to control, and frequently causes damage and destruction to the product.

The main object of the invention is accordingly to provide an improved method and apparatus for treating organic plastic objects, especially bottles, to improve their adherency to and compatibility with conventional adhesives and inks.

Another object is to provide an improved method and apparatus for effectively treating plastic bottles and similar objects more rapidly than any method or apparatus heretofore known.

A further object is to provide a method and apparatus for treating plastic containers during their filling and capping operations.

An additional object is to provide a method and apparatus for treating a succession of plastic containers axially aligned with each other.

A still further object is to provide a method and apparatus for treating a succession of plastic containers disposed in side-by-side relation, as in the usual filling and capping apparatus.

A further object is to provide improved electrical apparatus for the treatment of plastic bottles, whereby the bottles may be treated twice, or more times, substantially simultaneously thereby accelerating the rate of treatment and assuring its uniformity and effectiveness.

The foregoing and additional objects and advantages of the invention will become apparent from a reading of the following description taken in connection with the accompanying drawings, in which:

FIGS. 3–9 are horizontal views along lines 3—3, 4—4, 5—5, 6—6, 7—7, 8—8, and 9—9, respectively, of FIG. 1.

FIG. 10 is a schematic wiring diagram of the electrical circuit by which the electrodes of both forms of apparatus may be energized.

FIG. 11 is a schematic wiring diagram of the electrodes of the apparatus of FIGS. 1–9.

FIG. 12 is a plan view of another form of apparatus embodying the invention.

FIG. 13 is a side elevational view of the apparatus illustrated in FIG. 12.

FIG. 15 is a horizontal view of another form of the invention, sectionalized along line 15—15 of FIG. 16.

FIG. 16 is a vertical sectional view along line 16—16 of FIG. 15.

FIG. 19 is a schematic wiring diagram of the apparatus shown in FIGS. 15–18.

FIG. 20 is a side elevational view of another form of the invention.

FIG. 21 is an end view along line 21—21 of FIG. 20.

FIG. 22 is an end view along line 22—22 of FIG. 20.

FIG. 23 is a horizontal sectional view along line 23—23 of FIG. 20.

FIG. 24 is a longitudinal vertical sectional view along line 24—24 of FIG. 23.

Figure 26:
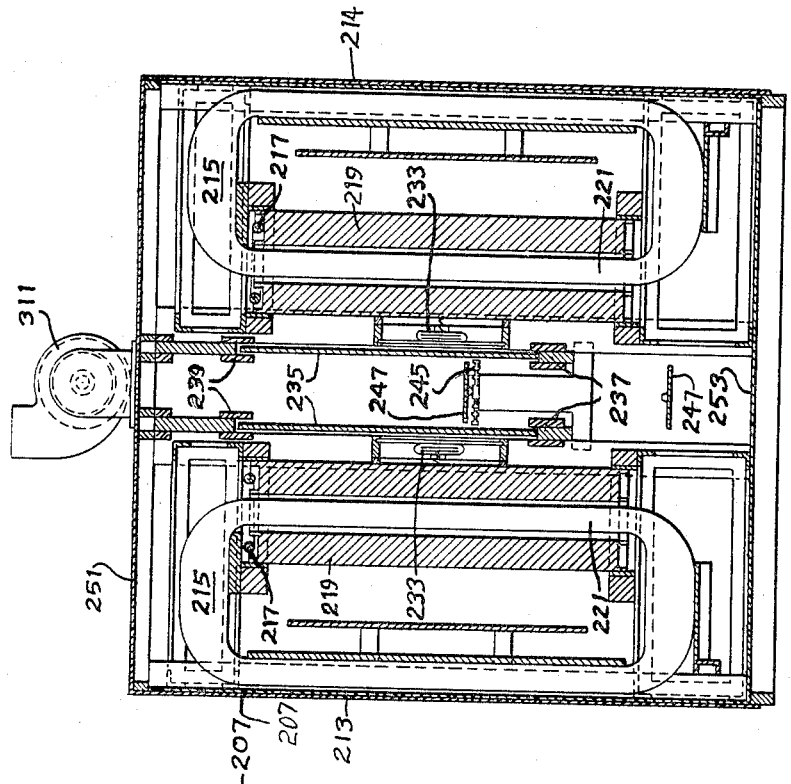
Figure 25:
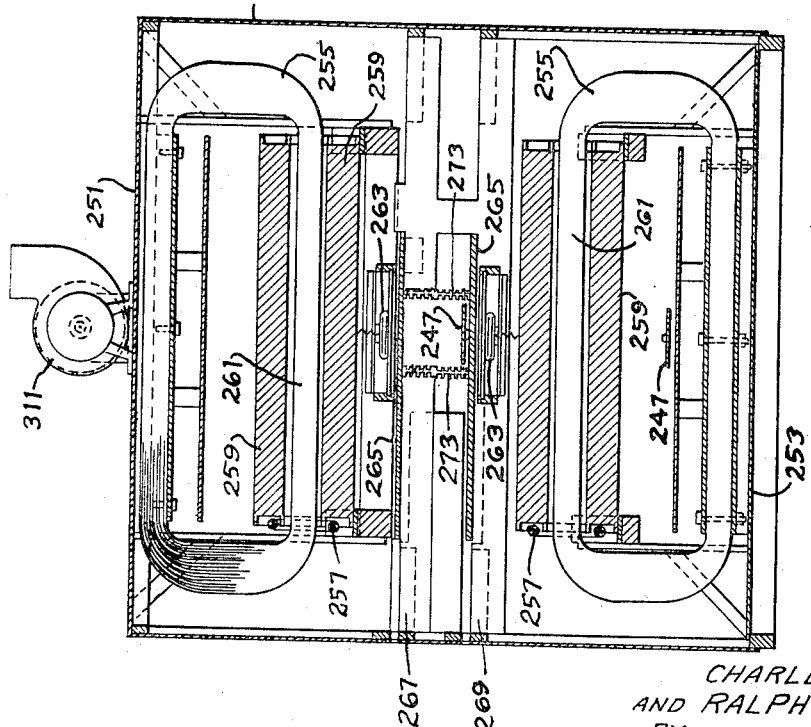

FIGS. 25 and 26 are transverse vertical sectional views along lines 25—25 and 26—26, respectively, of FIG. 24.

Figure 27:
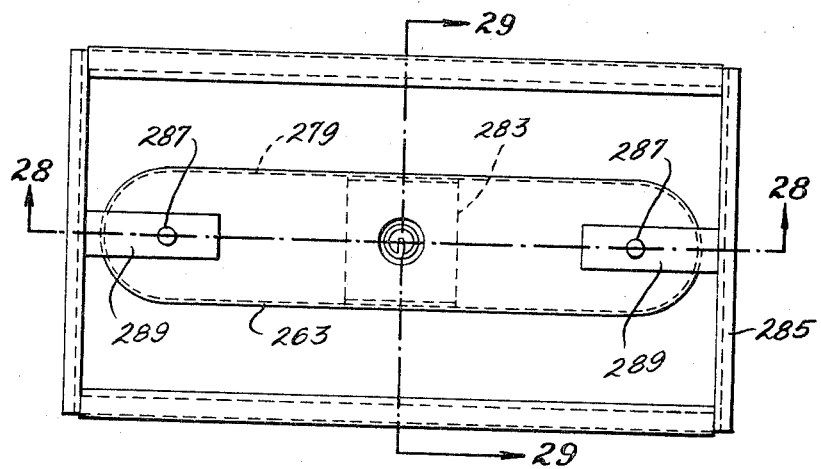

FIG. 27 is a rear elevational view of the electrodes used in the form of the invention illustrated in FIGS. 20–26.

Figure 28:
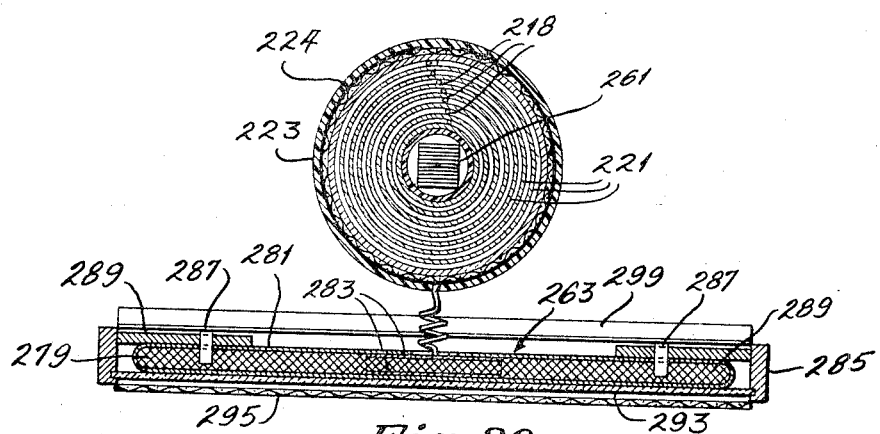

FIG. 28 is a sectional view along line 28—28 of FIG. 27.

Figure 29:
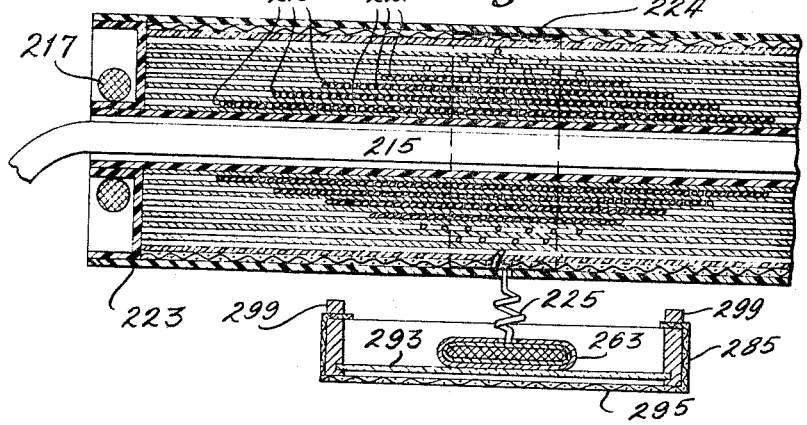

FIG. 29 is a sectional view along line 29—29 of FIG. 27.

FIGS. 30 and 31 are transverse vertical sectional views, respectively, along lines 30—30 and 31—31 of FIG. 23.

Figure 32:
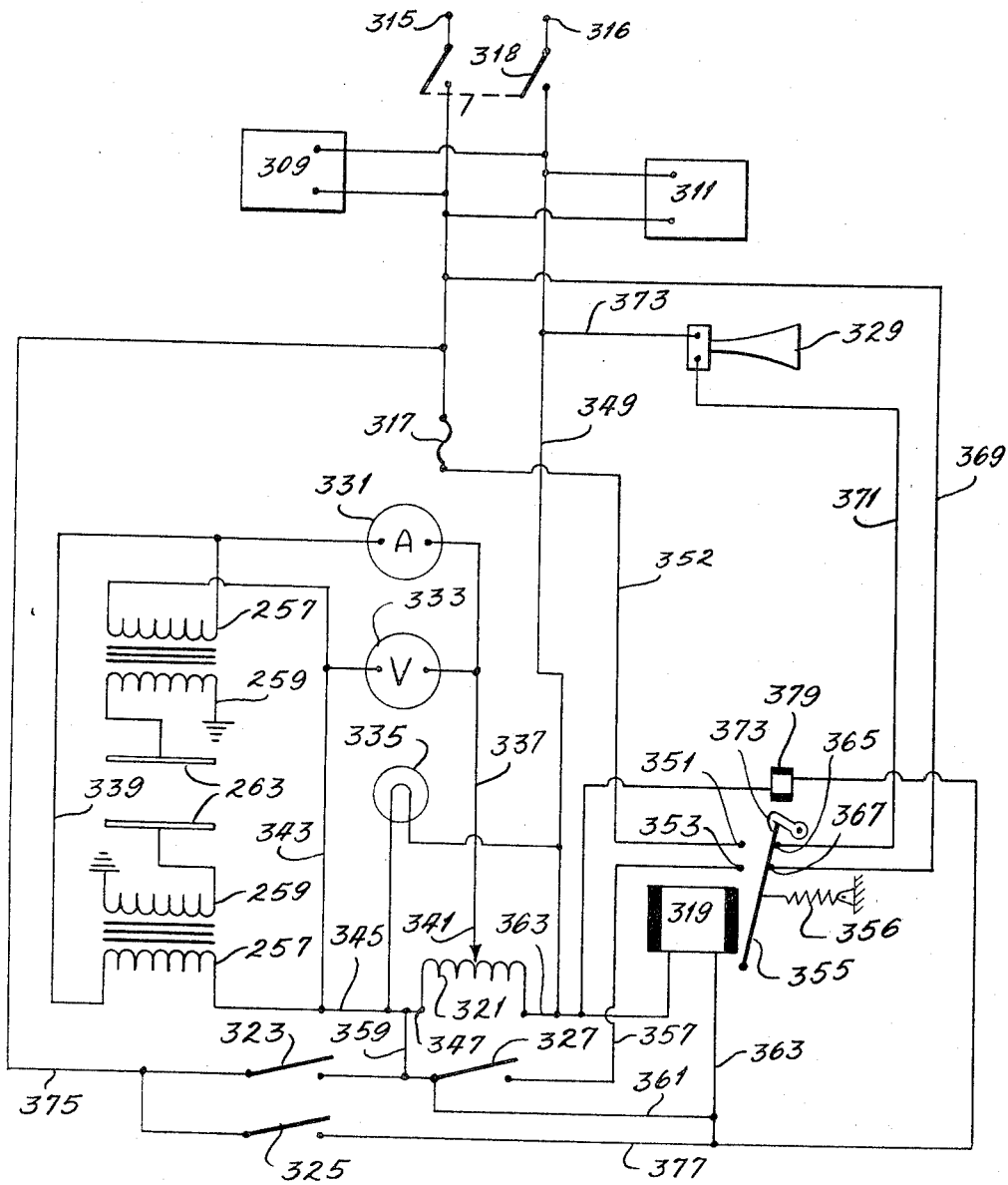

FIG. 32 is a schematic electrical circuit diagram of the vertical treating portion of the apparatus illustrated in FIGS. 20–32.

FIG. 33 is a longitudinal sectional view of a modified form of the transformer secondary coil.

FIG. 34 is an enlarged view of a portion of the surface of the coil illustrated in FIG. 32.

FIG. 35 is an enlarged sectional view of the outer surface of the coil illustrated in FIG. 32.

The present invention comprises the method of subjecting the external surface of the objects to be treated to intermittent electric sparks of short duration by moving the objects through a spark gap between one or more pairs of electrodes. In some forms of the method, the objects to be treated are translated through the spark gap, and are rotated relative to the electrodes while in the spark gap in order to ensure exposure to the spark discharge of as much of the external surface of the objects as is desired, and the live and grounded electrodes of each pair are not directly opposite each other across the gap, but are staggered to cause each spark to follow a diagonal course across the surface of the object being treated. This accomplishes two ends: It speeds up the treatment by treating a large area of the object's surface during each rotation, i.e., the area equal to the circumference or periphery of the object multiplied by the distance parallel to the axis of rotation, separating the electrodes. Further, it reduces the likelihood of burning through a treated object, which might occur if the electrodes were not staggered. Under some conditions, it is also desirable to position a second grounded electrode, of generally similar shape to the inside of the object to be treated, within the object, to assist the spark in following the outer surface of the object instead of passing around it at a distance. In another and preferred variation of the method, large area plate electrodes are used and the spark discharges are diffused uniformly throughout their surfaces, thereby contacting all exposed surfaces of the objects under treatment without rotation of the latter during treatment.

It appears that the ozonolysis of the plastic surface, caused by the ozone produced by the spark discharge, produces the desired increase in surface adherency, and that the effect of this ozonolysis is greatly accelerated by the heating of the plastic surfaces by the sparks. The absence of such heat in conventional corona methods of treating, combined with the lighter concentration of ozone, have made these methods ineffective when a treating chamber of sufficient size to accommodate objects such as plastic bottles, is provided, although such methods have been adequate for treating plastic film.

Referring now to the drawings, FIGS. 1 through 8 show one form of apparatus for treating plastic bottles. The apparatus comprises a housing having sheet metal walls 1, a base 2, and a top wall 3 of insulating material, top wall 3 being of suitable height and shape to be combined with a bottle filling and capping device A of known type, of which only a portion of the top is shown. The filling and capping device has a rotatable indexing disk D, the periphery of which is serrated as at E, to receive bottles B. The top of the filling and capping device is recessed to receive top wall 3 of the treating apparatus beneath a portion of indexing disk D, so that bottles being filled and capped by filling and capping apparatus A may be positioned by the same indexing disk D for treatment according to the present invention. For maintaining the position of the bottles in the indexing disk serrations, an arcuate guide member G, suitably spaced from the periphery of the disk D, is provided in fixed relation to the top of apparatus A and the top 3 of the treating apparatus housing.

Within housing 1, 2, 3 is positioned vertical guide cylinder 5, fixedly supported from the housing side walls 1 by the collar 7 and spokes 8 of a spider member 9, the periphery 10 of which is secured to side wall 1. Vertically slidably received within guide cylinder 5 is a hollow cylindrical member 11 in which is rotatably mounted, by means of two sets of ball bearings 13 spaced apart vertically from each other, an upright column 15 of "Bakelite" or similar insulating material. Column 15 is formed with a shoulder 16 adjacent the upper end of cylindrical member 11 and is supported thereby on the upper ball bearings 13. The upper end portion 18 of column 15 normally extends through an opening 20 in top wall 3 to a position flush with the surface thereof and is normally biased into this position by springs 22. Springs 22 are secured at their upper ends to spokes 8 of spider 9 and at their lower ends to cross bar 23 which extends through suitable slots 24 in the wall of guide cylinder 5, and underlyingly engages the lower end of cylindrical member 11. For stopping the upward movement of cylindrical member 11 and column 15 when the upper portion 18 of column 15 becomes flush with the upper surface of top member 3, cross bar 23 mounts upwardly-facing rubber blocks 27 which are engageable with the downwardly-facing heads of vertical stop-adjusting screws 29 which are positioned in brackets 30 on the housing side walls 1 by means of suitable nuts. Secured to the top of guide cylinder 5 is a cylindrical shield member 32 of insulating material, and suitably secured to and passing through the walls thereof are two diametrally opposing live electrodes 33 spaced apart from each other within the shield member and each connected by conductors 35 to a source of electric current, as will be described later. At 90° to the position of live electrodes 33, measured about the axis of the shield member 32, a second pair of electrodes 37 are suitably secured to and pass through the wall of cylindrical shield member 32. The latter electrodes 37 are similarly spaced apart diametrally of the shield member and are grounded by being connected at their outer ends by metal straps 39 and 40 to the housing side wall 1.

By means of the indexing apparatus A, D, E, G, plastic bottles B may be positioned individually in registry with opening 20 in treating apparatus housing top wall 3 and resting on the top surface of column 16.

Figure 1:
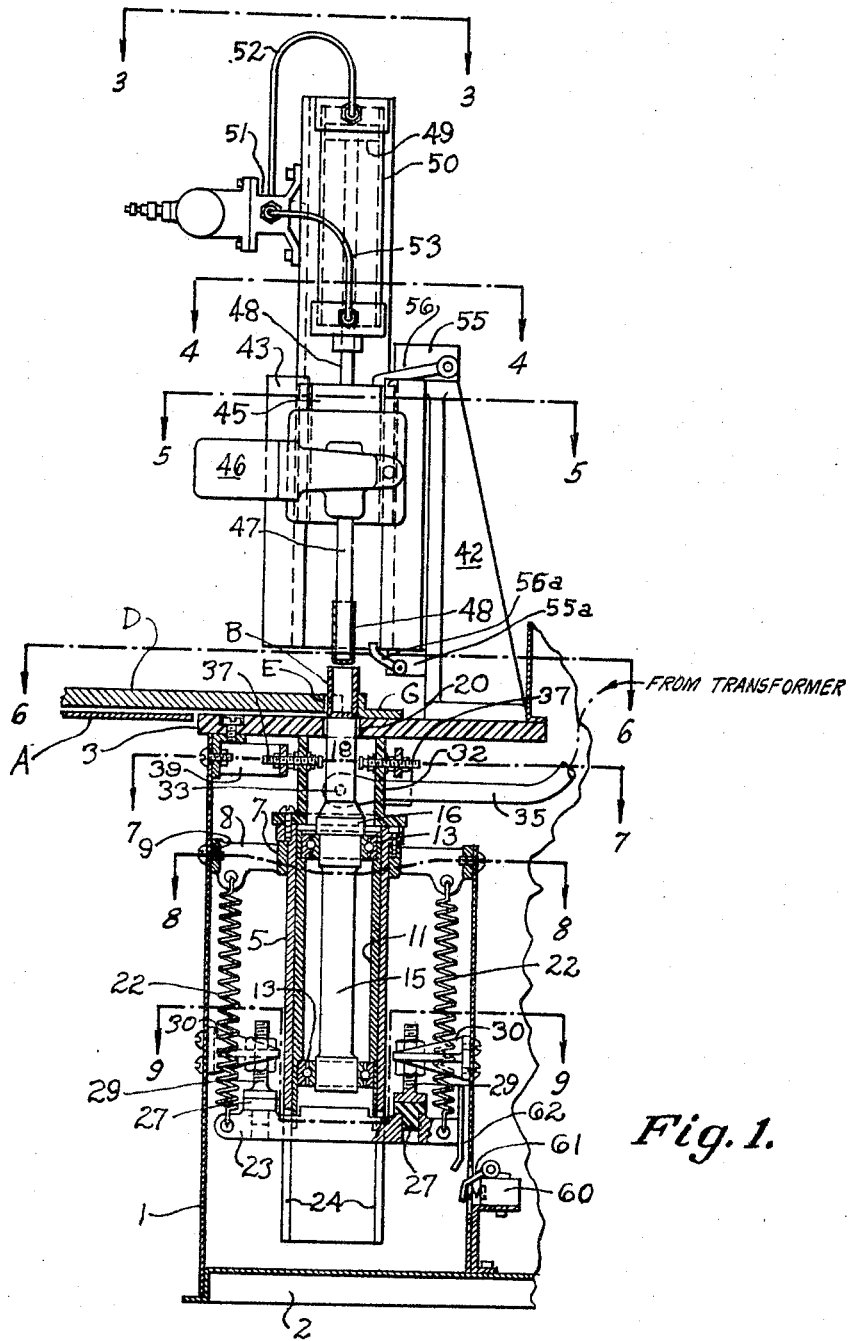
FIGS. 1 and 2 are front views, partially sectionalized, of one form of apparatus embodying the invention.
Figure 2:
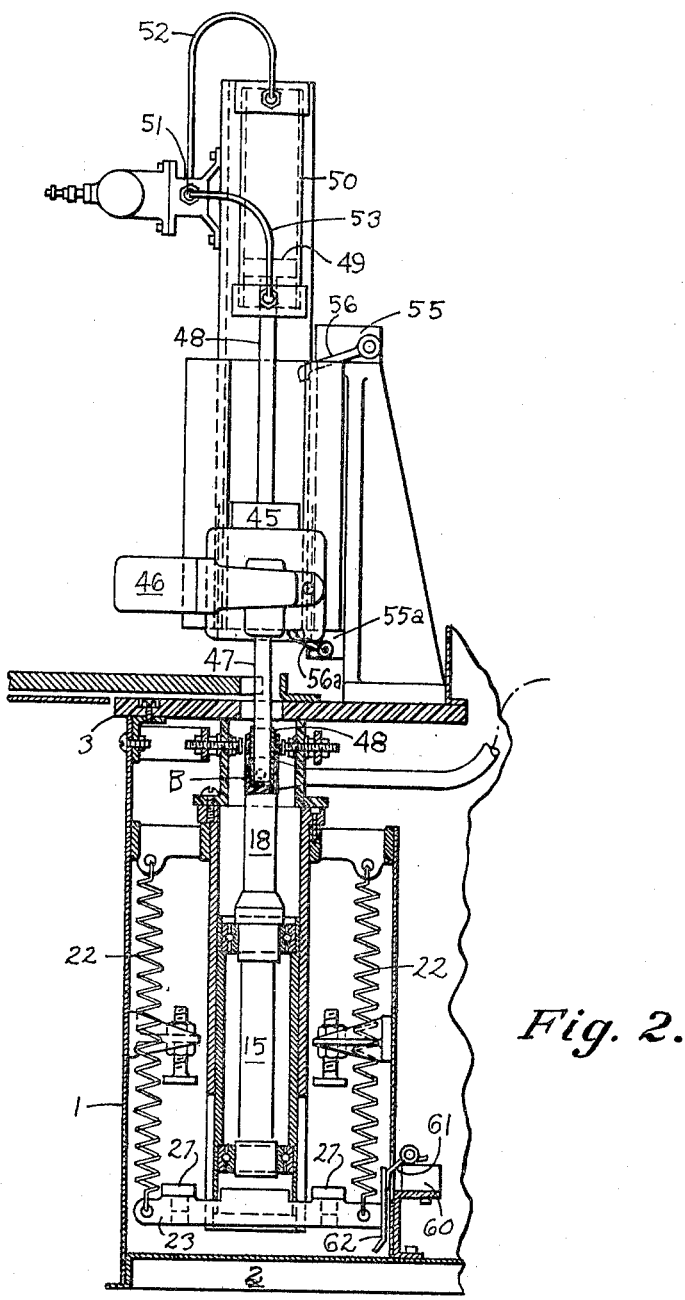

For positioning the bottle between the electrodes and rotating it while so positioned, top wall 3 mounts an upstanding bracket 42 to which is secured a vertical guide member 43. Guide member 43 vertically slidably mounts a crosshead 45 which carries an electric motor 46 suitably geared to a depending vertical shaft 47, the lower end portion of which is covered with a coating 48 of dielectric material and is of suitable size to be received within bottle B. As shown in FIG. 1, shaft 47 is sufficiently elevated that its lower end clears the top of bottle B; this is the position of the plunger shaft 47 while the bottles are being indexed. When a bottle is properly indexed, i.e., is in registry with opening 20 and the upper end of column 15, it is necessary that it be urged downwardly into the cylindrical shield member for treatment by the electrodes, after which it must be returned to the upper surface of the treating apparatus housing for movement to another station and replacement by another bottle for treatment. Crosshead 45 and shaft 47 are connected by piston rod 48 to piston 49 of pneumatic cylinder 50 which is contrtolled by an electric four-way valve 51 of known type, having an inlet port connected to a source of compresed air, an exhaust port, and outlet ports connected by suitable conduits 52 and 53 to the upper and lower ends respectively of cylinder 50.

As shown in FIG. 1, the piston 49 has been urged to its uppermost position by the admission of air to the lower part of the cylinder through conduit 53 and the exhaust of air from the upper part of the cylinder through conduit 52 and valve 51.

For reversing the setting of valve 51 and causing downward movement of plunger shaft 47 after it has reached the upper limit of its movement, a suitable microswitch 55 is mounted on the upper end of bracket 42 and is provided with an arm 56 engageable with carriage 55 when the upper limit of the carriage movement is reached. When this occurs the indexing disk D, rotating in a clockwise direction, will move the treated bottle B out of alignment with opening 20 and will position an untreated bottle in its place. Carriage 45 and plunger shaft 47 will move downwardly until the lower end of plunger shaft 47 contacts the lower surface of the bottle, whereupon it will cause the bottle and column 15 to move downwardly until the bottle is positioned between electrodes 33 and 37. This will cause a similar downward movement of cylindrical member 11 and cross bar 23. For energizing the electrodes a microswitch 60 is mounted near the lower end of the treating apparatus housing and it is provided with a pivoted operating arm 61 which is engageable with a cam 62 on cross bar 23 when the bottle reaches its proper position for treatment between the electrodes. An additional microswitch 55a, mounted on the lower end of crosshead guides 43 is provided with an operating arm 56a arranged for engagement with the lower edge of crosshead 45, when the latter reaches its lowermost position, to reverse the flow of air to cylinder 50 and cause upward movement of the plunger shaft 47.

Electric current is preferably, but not necessarily, supplied to the live electrodes by the electrical circuit shown in FIG. 10. This comprises a pair of conductors 64 and 65 connected to a source of 110 volt alternating current. Conductor 64 is connected to the primary windings 66, 67, 68 and 69 of a transformer 70 comprising a laminated iron core 71 of hollow rectangular shape comprising side members 71a, end member 71b, and intermediate cross member 72. Primary windings 66 and 67 are in series with each other and are connected in parallel with primary windings 68 and 69 which are also in series with each other. Primary windings 67 and 69 are connected by conductors 73 and 74 to the primary windings 75 of isolation transformers 76 and 77, the secondary windings 78 of which are in series with each other, being connected to each other by conductors 79 and 80, the latter of which includes a resistance 81. The primary windings 75 of isolation transformers 76 and 77 are connected in parallel with each other, by conductors including resistances 82 and 83 to conductor 65. The secondary windings 84 and 85 of transformer 70 are on the end members 71b of transformer core 71 and are connected by conductors 35 to live electrodes 33. The function of this circuit is as follows:

When it is energized, one of the live electrodes will fire before the other because it is impossible to absolutely balance them. When the electrode connected, for example, to the left hand side of transformer 70, fires, it causes the associated primary windings 66 and 67 of transformer 70 to attempt to draw more current. Increased current through the associated isolation transformer 76 raises the voltage on the other isolation transformer 77 by means of the coupling 78, 80, 81 between them. The choking effect of isolation transformer 76 then extinguishes the spark from the electrode connected to the left hand secondary winding and the increased voltage from isolation transformer 77 initiates a sparking condition in the right hand windings of the transformer. The lack of balance between the two sides of the transformer is enhanced by the fact that the primary windings 66, 67 and 68, 69 are wound in such a way that they oppose or buck one another in the central leg 72 of the transformer core.

Figure 6:
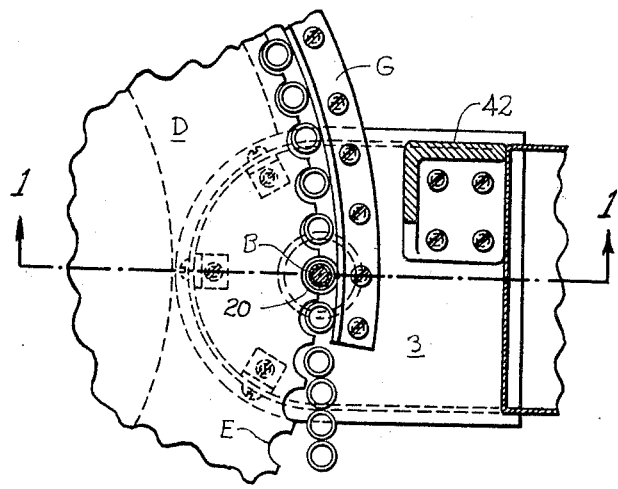
Figure 7:
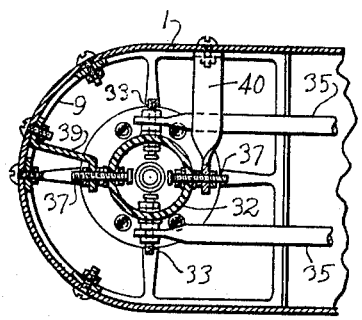
Figure 17:
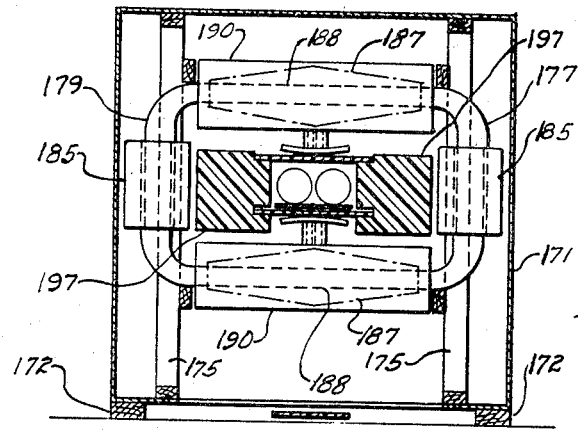
FIG. 17 is a vertical sectional view along line 17—17 of FIG. 15.

Operation of the treating apparatus is as follows:

The indexing disk D advances a bottle B to the position best shown in FIG. 6 with the bottle in registry with opening 20 in the insulated top wall 3 of the treating apparatus housing. At this time the parts of the apparatus are in the position shown in FIG. 1 with plunger shaft 47 at its uppermost position clear of the top of bottle B. As soon as the bottle is in registry with opening 20, electric valve 51 connects air conduit 53 to an exhaust port and admits air through air conduit 52 to the upper side of piston 49 which urges the piston downwardly in cylinder 50, causing similar downward movement of crosshead 45 and plunger shaft 47, the latter being simultaneously rotated by motor 46. The lower end of plunger shaft 47 enters bottle B, urging it and column 15 downwardly against the tension of springs 22 until the lower end of bottle B approaches the electrodes, whereupon cam 62 engages switch arm 61, energizing the electrodes. The bottle and column 15 are being rotated by plunger shaft 47 and the sparks from live electrodes 33 follow a diagonal path around the sides of the bottle to their cooperating grounded electrodes 37. Since the bottle is being rotated and is translated through the space between the electrodes, all vertical portions of the bottle exterior surface will be suitably oxidized and hardened by the sparks, thereby increasing their adherency to and compatibility with inks and adhesives. When the lower limit of movement of the bottle is reached, the crosshead engages arm 56a on microswitch 55a, causing a reversal of electric valve 51 and the consequent exhaust of air from the portion of cylinder 50 above piston 49 and the admission of air to the cylinder below the piston, causing the piston to move upwardly and return the plunger shaft 47 and the bottle B to the position shown in FIG. 1, whereupon the indexing disk D moves the treated bottle away from this position and substitutes another bottle in registry with opening 20 and the upper end of column 15.

Figure 14:
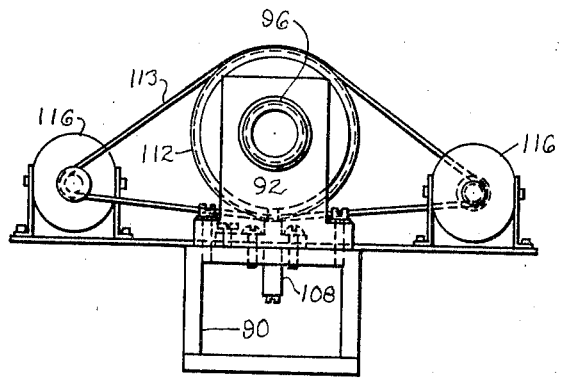
FIG. 14 is an end view of the apparatus illustrated in FIGS. 12 and 13.

Another embodiment of the invention is shown in FIGS. 12–14 in which the bottles are passed through the treating apparatus in axial relation with each other, rather than parallel as in the first form of the invention. This form of the invention comprises a base 90 and three pairs of upstanding brackets 92, 93, 94 mounted thereon. Each pair of brackets mounts a horizontal tube 96 of "Pyrex" or other heat-resistant glass, the middle portions of each of which are surrounded by a sleeve 97. The three tubes 96 are aligned axially to provide a path for a column of bottles through the apparatus, their adjacent ends being spaced apart to provide a space for the spark treatment. Near the ends of end sleeves 97, which project inwardly from brackets 92 and 94, and on each end of the middle sleeve 97, are mounted ball bearings 98 which mount a pair of transparent cylinders 99, 99 between end brackets 92 and 94 and middle brackets 93 respectively, for rotation about the axis of "Pyrex" tubes 96. Each of the transparent cylinders 99 mounts a pair of electrodes 101, 101 diametrically opposite each other and spaced apart axially of the cylinders with their tips extending into the spaces between adjacent tubes 96. Electrodes 101 are suitably clamped as at 103 to the walls of cylinders 99, so as to rotate with cylinders 99, and are each connected by bars 105 to an annular band 106 of copper or other conducting material on the end portions of each of cylinders 99. Spring loaded brushes 108, carried by base member 90, are held in constant engagement with rings 106, the brushes associated with one of the electrodes in each of the cylinders being connected by means of suitable conductors 110 with a source of current such as the transformer illustrated in FIG. 10 and the other electrodes being grounded. Each of the cylinders 99 mounts at one end a sheave 112 connected by a belt 113 to the shaft 115 of a motor 116, motors 116 being arranged to rotate cylinders 99 and their electrodes in opposite directions.

Operation of this device is as follows:

Bottles B are inserted in one of the tubes 96 from its end and are pushed through the initial tube 96. As they pass from the initial tube to the intermediate tube, their surfaces are exposed to the sparks between electrodes 101, 101, complete exposure being assured by the axial spacing of the electrodes and their rotation relative to the bottles as well as by the translation of the bottles through the spark gaps. Each of the bottles is again similarly treated when it passes the space between the intermediate and final glass tubes 96. By using a plurality of spark gaps, it is evident that the speed of treatment can be substantially increased.

A third and preferred form of the invention is shown in FIGS. 15–19 in which the numeral 171 indicates a sheet metal housing supported on feet 172 and containing upright framing 175, preferably of wood or other dielectric material, which mounts a transformer generally indicated at 177.

Transformer 177 has a core 179 of generally elongated rectangular shape with rounded corners, consisting of a plurality of strips 181 of steel or other magnetic material, in laminar relation with all their adjacent ends overlapping in the same region, as at 183, to facilitate assembly and disassembly of the transformer. On each of the ends of core 179 primary coils 185 are mounted, and are connected to a source of 110-volt 60-cycle alternating current, preferably through a variable autotransformer 180 or similar controller. Secondary coils 187 are mounted on the elongated legs 188 of core 179 and consist of a plurality of spiral windings 189 the innermost of which is separated from the core by a sheet 190 of plastic or other dielectric material, successive windings being interleaved and the outer winding being covered by similar sheets 190. Coils 187 are tapered, i.e., each succeeding winding has fewer turns than the immediately preceding inner winding and the end turns of each winding are spaced a greater distance from the end of the coil than are the end turns of the preceding inner winding. The three outermost windings 191 have the turns widely spaced. By this construction it is possible to achieve very high voltages, e.g., 200,000 volts, without the requirement for an insulating oil bath. The outer covering sheet 190 of each of the secondary coils 187 mounts a short hollow cylindrical post 193 of plastic or other dielectric material and the extremities of each of posts 193 mount a large-surface electrode 195, preferably in the form of a plate, slightly curved, as shown. The inner windings of secondary coils 187 are grounded and the outer windings are connected by leads 197 to electrodes 195. Electrodes 195 oppose each other and are spaced from each other a sufficient distance to permit the passage of plastic objects between them for treatment. A plastic treating chamber is formed in the space between electrodes 195 by spacers 197, of plastic or other dielectric material, which extend at right angles to the plane of the transformer core, through the transformer core, and mount, slightly spaced from each of the electrodes 195, a flat sheet 199 of plastic or other dielectric material, sheets 199 being spaced apart from each other vertically a sufficient distance to permit the passage between them of the largest plastic objects it is desired to treat. Because of the resistance offered by sheets 199, sparks across the gap between electrodes 195 are supressed, i.e., extinguished, as the current increases, at frequent intervals, probably of 1 to 10 microseconds, after which they reform at new spots on the surfaces of the sheets 199, 199, this being diffused throughout the area of the treating chamber, so that the objects to be treated need only be placed in the chamber, without any requirement for moving them therein relative to the electrodes as in the other forms of the invention disclosed herein. Housing 171 is provided with a passageway 201 through it, registering with the chamber formed by sheets 199 and beams 197 and a suitable conveyor belt 203, supported on rollers 204 and driven by motor 205 extends through passageway 201 for conveying plastic objects B through the treating chamber.

Operation of this embodiment of the invention is as follows:

The transformer 177 is energized to produce a voltage in the order of 200,000 volts on the secondaries. This produces a luminous display between sheets 199, 199 which may be characterized as a suppressed spark, the suppression being provided by sheets 199 which separate the electrodes from the treating chamber, i.e., the voltage difference between the electrodes becomes concentrated across the resistance (sheet 199) as the current rises, thereby suppressing or actually extinguishing the spark. Because of the extended area of the electrodes and plastic sheets 199, the suppression of the spark is limited to a small channel, possibly no greater than a quarter inch in diameter, permitting and causing a new spark to develop at another location so that in a single half cycle of the 60-cycle alternating voltage supply, the spark thus migrates rapidly through the area of the spark chamber between sheets 199, 199. Plastic bottles B and other objects are placed on the conveyor belt, which is set into motion, and as they pass through the gap between sheets 199, 199 they are intensely bombarded by positive and negative ions and electrons, which because of the suppression of the spark and its reformation at a myriad number of spots throughout the area of the chamber, the bombardment is widely diffused over the surface of the material, causing a practically instantaneous treatment with uniform coverage of the plastic objects at an extremely fast rate.

A fourth form of the invention is illustrated in FIGS. 20–32, in which the numeral 207 indicates a housing comprising framing 209 sheathed with sheet metal.

To assure that all portions of the container surfaces will be treated, irrespective of their positions while passing through the apparatus, this embodiment has two treatment chambers, the first (on the left side of FIG. 20) having a horizontal spark gap and the second (on the right side of FIG. 20) having a vertical spark gap.

As best seen in FIG. 26, the horizontal treating portion of the device comprises a pair of transformers mounted respectively against opposite side walls 213 and 214 of the housing and each having vertically elongated generally rectangular laminated cores 215, primary coils 217, and vertically elongated secondary coils 219, as best seen in FIG. 32.

The secondary coil construction, illustrated in FIGS. 28 and 29, comprises a plurality of spiral windings 218, the innermost of which is separated from the core by a solid sheet 220 of dielectric material surrounding the core, successive windings being interleaved by similar sheets 221. The coil is tapered, with each winding having fewer turns than the immediately preceding inner winding, and the end turns are spaced a greater distance from the ends of the coil than the end turns of the preceding inner winding. The solid sheet covering the outer winding is surrounded by a sheet of netted dielectric plastic material 222, and the entire coil assembly is surrounded by a cylindrical dielectric casing 223 formed of glass fibres bonded together with epoxy resin. The ends of casing 223 project some distance from the ends of sheets 221, and receive recessed caps 226 of similar material, the latter being sealingly bonded to inner cylindrical sheet 220 and to outer shell 223 to provide a sealed chamber surrounding the coil. The chamber thus formed is filled with a gaseous delectric, such as sulphur hexafluoride ($SF_6$). The layer of netting 222 provides a space between the outer plastic sheet 221 and the casing 223 to receive the gaseous dielectric and to provide a voltage gradient to the ground. The tapered construction of the coil, the interleaved layers of dielectric material, the heavy outer dielectric casing, and the gaseous dielectric combine to permit very high voltages in the coil without danger. Primary coils 217 are mounted in one of the recessed end caps 226 of each of the secondaries.

Between netted sheet 222 and casing 223 a shield 224 of heavy sheet copper is interleaved and almost, but not quite, completely surrounds the center portion of the coil, the inner winding of each of the secondary coils is grounded and the outer winding is connected to shield 224, which in turn is connected by wire 225 to electrode 233, electrodes 233, 233 being spaced apart transversely of the housing to form a horizontal spark gap between them. In case of shorting within the coil, sparks will strike the shield 224 rather than the fine wire of the windings. The shield also serves to dissipate troublesome radio frequencies.

Adjacent the opposing surfaces of each of electrodes 233 is positioned an upright plate 235 of dielectric plastic material, preferably polyethylene, plates 235 being spaced apart from each other transversely of the machine to form the side walls of the treating chamber. To facilitate removal and replacement of plates 235 they are edge-mounted in grooved trackways 237 and 239 supported by the housing framing 209, and the end wall 241 of the housing (FIG. 22) is vertically slotted at 243 to permit their withdrawal and insertion. The bottom wall 245 of the chamber, which also forms a support for conveyor belt 247 is similarly formed of dielectric material, such as polyethylene, and is supported from the housing framing. The upper and lower surfaces of wall 245 are formed with a series of longitudinal grooves 246 to prevent the horizontal high voltage sparks from initially following a repetitive path along the surface, oxidizing the surface along this path, and thereafter being confined to the oxidized path rather than passing across the air gap.

Figure 18:
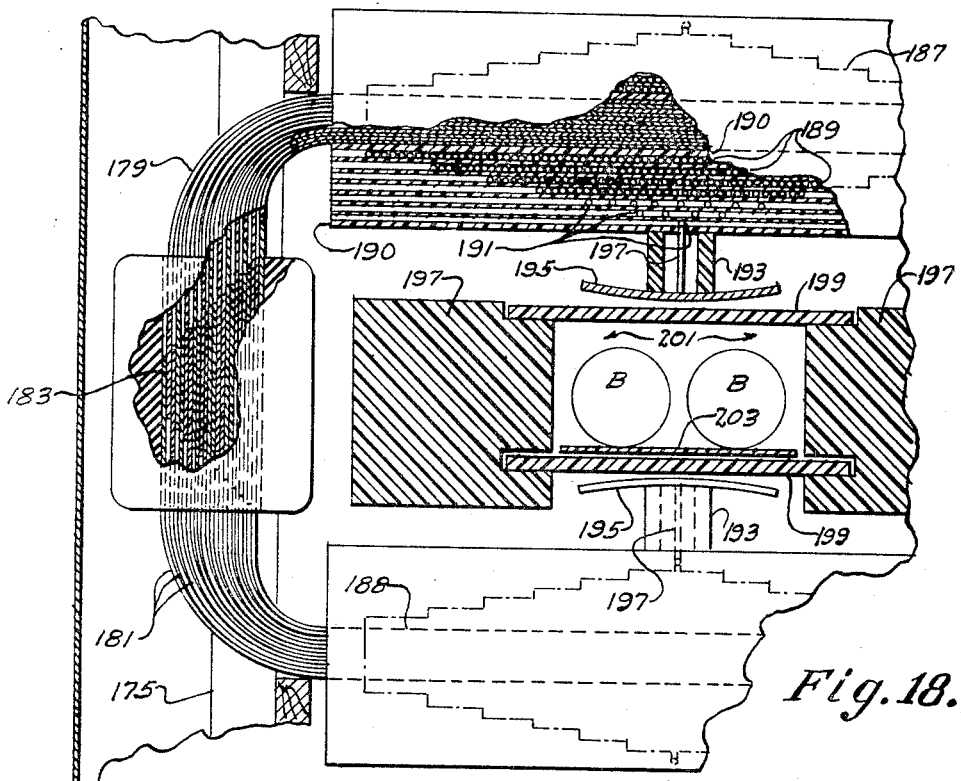
FIG. 18 is an enlarged view of a portion of FIG. 17, further sectionalized in part to show details of the transformer construction.

The vertical treating portion of the device, as best seen in FIG. 25, comprises a pair of transformers mounted, respectively, against the top and bottom walls 251 and 253 of the housing and each having generally rectangular cores 255 elongated transversely of the housing, primary coils 257, and transversely elongated horizontal secondary coils 259 similar to that illustrated in FIG. 18, on the inner legs 261 of cores 255.

One end of each of the secondary coils is grounded and the other is connected to a horizontal electrode 263, electrodes 263, 263 being spaced apart vertically to form a vertical spark gap between them.

Adjacent the opposing surfaces of each of the electrodes 263 is positioned a horizontal plate 265, plates 265, 265 being spaced apart from each other vertically to form the top and bottom walls of the treating chamber. To facilitate removal and replacement of plates 265 they are edge-mounted on tracks 267 and 269 supported by housing frame 209, and side wall 214 of the housing is horizontally slotted at 272 to permit their withdrawal and insertion. The vertical treating chamber has vertical side walls 273, 273 which are horizontally grooved as at 275 to prevent high voltage spark discharges from passing down the wall, oxidizing it, and then following the track oxidized thereon, instead of passing through the air gap of the treating chamber.

The construction of the horizontal electrodes 233 of the vertical treating chamber is shown in detail in FIGS. 27–29. The vertical electrodes 233 are of identical construction. Each consists of an oblong plate 279, of foamed plastic, completely covered with aluminum foil, the electrical connection thereto of the transformer secondary being provided by a square copper plate 283 at the center of the electrode. The electrode is mounted in a rectangular frame 285 of dielectric material and is centrally positioned therein by dowels 287 passing through inwardly extending brackets 289 on the ends of frame 285. Frame 285 is grooved as at 291 to mount a glass plate 293 covering the front of the electrode, and glass plate 293 is in turn covered by a sheet of netted dielectric material 295. The glass and netted material cooperate to diffuse and suppress any corona on the electrode to protect dielectric plates 235 and 265 from corona and eliminate corona from the treating chambers.

The two treating chambers are aligned longitudinally of the housing to form portions of a tunnel extending through the housing from one end wall to the other, the end walls being suitably apertured at the tunnel ends, and endless belt 247 extends through the tunnel thus formed to carry the work through the treating chambers. Belt 247 is formed of netted flexible dielectric plastic material, such as polyethylene or polyurethane, bonded to and supported along its longitudinal centerline on a solid V-belt 248 of the same material, the center location of the denser V-belt being dictated by the fact that it attracts the electrical discharges in the vertical treating chamber, and hence does not rob the chamber of treating discharges as would be the case if belt 247 were supported on one or both of its sides by a V-belt, in which case the charges would be attracted to the sides of the belt, leaving the middle portion of the chamber without charges. Outwardly of the ends of the tunnel, belt 247 is supported on idler drums 300 and 301 rotatably mounted on brackets 302 and 303 extending longitudinally outwardly from the end walls of the housing, and at a lower level the belt is supported by drums 305 and 307, its lower leg passing through the housing by means of apertures 308 in the end walls. For moving the belt an electric motor 309, mounted on an end wall of the housing, is drivingly connected to drum 307.

For eliminating ozone from the treatment chamber, the housing mounts a motor driven exhaust blower 311 on its top wall 251.

The electrical circuitry of the vertical treating portion of the apparatus is illustrated schematically in FIG. 32 in which the numerals 315 and 316 refer to terminals arranged for connection to a source of commercial frequency 110-volt alternating current, and 318 is the main switch. It will be understood that the horizontal circuit is identical except for the connection to the upright transformer primaries 217, 217. The circuit includes quick acting fuse 317, double-pole double throw relay 319, variable autotransformer 321, normally open switches 323 and 325, normally closed switch 327, transformer primaries 257, 257, audible alarm 329, ammeter 351, voltmeter 333, and pilot light 335. The voltage on the transformer primaries 257, 257 is regulated by autotransformer 321, being connected in parallel, by lines 337 and 339, to the sliding tap 341 of the autotransformer, and by lines 343 and 345 to autotransformer coil terminal 347, so that when the autotransformer coil is energized, the voltage on the treating primary coils, and consequently on the secondaries, can be varied by manually moving the sliding tap 341 of the autotransformer.

One coil terminal of the autotransformer is connected directly by line 349 to power input terminal 316. The normal power input to the other coil terminal 347 of the autotransformer includes relay 319, one contact 351 of which is connected to power input terminal 315 by line 352 including fuse 317. Contact 353 of relay 319, to which contact 351 is connected by relay contactor 355 when the relay is energized, is connected by line 357, normally closed switch 327, and line 359, to autotransformer coil terminal 345, so that when the relay is energized, the autotransformer will also be energized. Switch 327 is preferably of the snap action type arranged to be opened by the slider 341 of the autotransformer when the latter is moved to a predetermined maximum position. The terminal of switch 327 remote from line 357 is connected by lines 361 and 336 to relay coil 319, which is also connected by line 363 to power input line 349, so that when fuse 317 is passing current and switch 327 is closed, the relay will be energized, causing to pass into terminal 347 of the autotransformer. Current input to the coil will be interrupted if a predetermined amperage is exceeded, in which case fuse 317 will blow out, or when the autotransformer sliding tap is moved past a predetermined maximum position, causing switch 327 to open, thus opening the circuit through lines 261 and 363 to the relay. In both instances the relay will be deenergized and spring 356 will move the relay contactor away from contacts 351 and 353 and into engagement with relay contacts 365 and 367 to close circuit, comprising lines 369, 371 and 373 through audible alarm 329, thus causing it to sound and warn the operator of the apparatus of the difficulty.

To restart the machine the autotransformer tap must be moved to the "zero" position, and if the fuse is blown out it must, of course, be replaced. If the stoppage was caused by too high a setting of the autotransformer, movement of the tap 341 toward the "zero" position permits switch 327 to close when the autotransformer tap position goes below the predetermined maximum position. Although this closes the circuit through relay coil 319, it does not cause movement of relay contactor 355 because the latter is retained out of engagement with contacts 351 and 387 and in engagement with contacts 365 and 367 by latch 373.

For starting the apparatus, a by-pass line 375 connects input terminal 315 with normally open switches 323 and 325, which are arranged in parallel with each other. Switch 323 is connected directly to autotransformer coil terminal 347 by line 359, and switch 325 is connected by lines 377 and 363 to relay coil 319 and latch release coil 379, so that when the autotransformer slider 341 is moved to the "zero" position, it will close switches 323 and 325, the former energizing the autotransformer coil directly, and the latter energizing the relay latch release coil 379 to release latch 373 and permit the relay coil 319 to move contacts 355 into engagement with contacts 351 and 353 to close the circuit through the autotransformer, which includes fuse 317, lines 352 and 353, closed switch 327, and line 359. The autotransformer sliding tap 341 may then be moved off the "zero" position and to any desired position up to the predetermined maximum. When moved off the "zero" position, snap action switches 323 and 325 will be returned to their normally open position and the autotransformer will be energized through the relay circuit unless fuse 317 blows out.

The circuit also includes connections from the input power levels to the variable speed control of belt drive motor 309 and to blower 311.

Operation of the device illustrated in FIGS. 20–32 is as follows: With variable taps 341 of autotransformer 321 set at "zero," main switches 318 are closed. With the autotransformer tap 341 at "zero," switches 323 and 325 are closed as is switch 327, so that relay latch coil 379 is energized, releasing latch 373, and relay coil 319 is also energized, closing the circuit through fuse 317 to autotransformer coil 321. At the same time, i.e., while tap 341 was zeroed, the autotransformers were energized by by-pass lines 375, through switches 323 and lines 359, thus making it possible to start the apparatus without receiving current through fuses 317, which would be overloaded with the high starting current. When taps 341 are moved away from the "zero" position, switches 323 and 325 open automatically, but the coils 321 are now energized by closed circuits 315, 317, 352, 351, 353, 357, 327, 359 and the relay coils 319 are energized by the same circuit and lines 361 and 363, thus keeping contacts 351, 353 closed. Autotransformer taps 341 are moved to a position producing the required voltage on the secondaries 259, 259 (and 219, 219) for providing sparking between electrodes 263, 263 (and 233, 233). When switch 318 on the vertical treating portion of the machine, shown in FIG. 32, was closed belt dirve 309, and blower 311 were also energized, permitting the feeding of plastic bottles or other work to the apparatus by means of moving belt 247. As the work passes between vertically spaced horizontal electrodes 263, 263, the diffused vertically directed sparks react on all surfaces of the work having a horizontal component, and as the work moves on to and through the spaces between horizontally spaced vertically disposed electrode 233, 233, the diffused horizontally directed sparks react on all surfaces of the work having a vertical component.

In the event that autotransformer taps 341 are moved to a higher than predetermined voltage, normally closed switches 347 will open, breaking the circuit through relay coils 319, permitting spring 356 to move relay contactors 355 to the right, opening contacts 351, 353, to break the autotransformer coil circuits, and close the circuits through contacts 365, 367 to energize the audible alarms 329. Similarly, if the system begins to draw a higher than predetermined current, causing fuse 317 to blow out, the circuits through relay coils 319 will be broken and the audible alarm circuits closed, thus protecting the electrodes and associated structure from the destructive effect of an excessively high current.

If the fuse is blown out, it must be replaced, and in both instances the apparatus can be started only by moving the autotransformer taps 341 back to the "zero" position because only by closing switch 325 can latch release coils 379 be energized to release relay latches 373 whereby the circuit through fuse 317 may again be closed by relay contactor 365.

A modified form of secondary coil is illustrated in FIGS. 33–35, in which the numeral 451 indicates the laminated transformer core. Core 451 is surrounded by a tube 453 of dielectric material, preferably formed of glass fibres bonded together with epoxy resin, the middle portion of which is almost but not completely surrounded by a cylindrical sheet of copper 455, grounded as at 457 for the purpose of providing a large area ground. Around tube 453 is formed a shell 459 of similar material, the end portions 461 of shell 459 being cylindrical and in contact with the end portions of tube 453, and the intermediate portion 463 being convex in longitudinal section and of circular transverse section. This provides a good geometric surface for dissipating corona. The exterior of intermediate portion 463 is formed with a series of equally spaced annular grooves 465, all connected by a longitudinal groove 467 and the windings 469 are positioned in the grooves, beginning at the ends of intermediate portion 463, where they are grounded as at 471. In the end grooves, a large number of windings occurs per annular groove, the number per groove gradually being reduced as the center of the intermediate portion is approached. The windings in each annular groove are connected to those in the succeeding grooves through longitudinal groove 467. At the center, the single remaining wire of each winding is connected to the electrode as at 473. The entire coil is encased in a housing comprising a cylindrical outer dielectric shell of the same material as members 453 and 459, closed at its ends by caps 477 and 479, each being secured to the end portion of members 359 and 375 by outwardly extending flanges 481 and 483. The primary coil 485 is positioned in the recess formed in cap 377 between flanges 481 and 483. Additional insulation is provided by charging the entire space within the exterior casing with a gaseous dielectric, such as sulphur hexafluoride ($SF_6$) under superatmospheric pressure.

The details of the method and apparatus disclosed herein may be varied substantially without departing from the spirit of the invention and the exclusive use of those modifications coming within the scope of the appended claims is contemplated.

What is claimed is:

1. Apparatus for treating the exterior surfaces of plastic objects to improve their adherency to and compatibility with inks and adhesives comprising a pair of electrodes spaced apart from each other, means including a source of electric current of sufficient intensity to produce a spark discharge across the gap between said electrodes, electrical conducting means connecting said electrodes and said source, and means for positioning the objects in the gap between said electrodes, said electrodes being arranged with regard to the size and configuration of the objects to provide a nearly direct electron path around the objects whereby desired portions of the object surfaces may be passed over by the spark discharges during the passage of the latter along said path from electrode to electrode.

2. Apparatus according to claim 1 including means for rotating said pair of electrodes and the object relative to each other.

3. Apparatus according to claim 1 comprising a member having a surface for supporting the objects and being formed with an aperture of suitable size and shape to permit the passage of an object therethrough, said pair of electrodes being disposed on the opposite side of said member from the object supporting side thereof, the spark gap between said electrodes being aligned with the aperture, a movable member aligned with the aperture and spark gap and having one end normally biased through the aperture into a position substantially coplanar with the object supporting surface, a rotatable plunger aligned with the aperture on the same side of said first-mentioned member as the object-supporting surface thereof and normally spaced therefrom a distance sufficient to clear an object on the object-supporting surface, and means for reciprocating said plunger to urge an object through the aperture and into the spark gap against the bias of said movable member and for permitting the object to move out of said gap and through the aperture.

4. Apparatus according to claim 1 comprising a wall spaced from said electrodes and having an aperture aligned with the spark gap, a member movable through the spark gap and aperture and normally yieldably retained with its end surface substantially coplanar with the surface of said wall away from said electrodes, a second member arranged for movement in alignment with the aperture and spark gap and normally positioned on the opposite side of said wall from said electrodes, said second member being engageable with a plastic object seated on the named end surface of said first member, means for imparting reciprocating and rotational movement to said second member whereby to urge said object through the aperture and into the spark gap and to rotate the object therein and to permit said first member to return the object to its first-named position.

5. Apparatus according to claim 4 in which there is a second pair of electrodes positioned on opposite sides of the spark gap and spaced axially and circumferentially from said first-named pair.

6. Apparatus according to claim 4 in which said second member is adapted for insertion in the plastic objects and is grounded to form an aditional electrode.

7. Apparatus according to claim 6 in which the portion of said second member insertible in the plastic object has a coating of dielectric material.

8. Apparatus according to claim 4 in which said first member is freely rotatable to accommodate rotation of the plastic object seated on its end surface.

9. Apparatus according to claim 4 including means for successively positioning individual plastic objects on the end surface of said first member prior to treatment and successively removing them therefrom after treatment.

10. Apparatus according to claim 1 comprising a pair of elements forming spaced, aligned passageways for the objects, a member rotatable about the common axis of said elements and mounting said pair of electrodes in opposed relation diametrically of said member, in the space between said elements, said passageway extending through the gap between said electrodes.

11. Apparatus according to claim 10 in which said electrodes are also spaced apart axially of said elements.

12. Apparatus according to claim 11 mounting a pair of nonrotatable brushes and in which said rotatable member mounts a pair of cylindrical bands of conducting material, each of said bands being connected to one of said electrodes, each of said brushes being resiliently urged into sliding engagement with one of said bands.

13. Apparatus according to claim 10 in which said rotatable member is of transparent dielectric material.

14. Apparatus according to claim 13 in which said passageway-forming elements are of heat-resisting transparent dielectric material.

15. Apparatus according to claim 10 including a second member rotatable about the common axis of said elements and mounting a second pair of diametrically opposed electrodes extending into one of the spaces between said elements and spaced apart transversely of the common axis of said elements, and means for rotating said rotatable members in different directions.

16. Apparatus according to claim 1 in which said electrodes comprise substantially flat conductive plates substantially parallel to each other and a sheet of dielectric material covering the face of each of said plates opposing that of the other, said sheets defining between them a treating chamber for plastic objects, said electrodes being of sufficient size to provide between them spark paths around the largest objects under treatment.

17. Apparatus according to claim 16 in which there is a second source of current of sufficient intensity to produce sparks across said gap, and means connecting each of said sources to a separate electrode.

18. Apparatus according to claim 16 including a second pair of similar electrodes disposed substantially at right angles to said first pair and spaced apart from each other, dielectric material covering the face of each of said second electrodes, said dielectric material coverings on said second pair of opposed electrodes forming between them a second treating chamber aligned with said first treating chamber, a second source of electric current of sufficient intensity to produce sparks across the gap between said second pair of opposed electrodes and electrical conductor means connecting said second source and said second electrodes.

19. Apparatus according to claim 16 in which said dielectric material covering includes a solid plate of plastic material.

20. Apparatus according to claim 16 in which said dielectric covering includes a plate of glass.

21. Apparatus according to claim 20 in which said plate of glass is in contact with the surface of the electrode.

22. Apparatus according to claim 16 in which said dielectric material covering includes a sheet of netted plastic.

23. Apparatus according to claim 16 in which each said dielectric material coverings comprises layers of glass, netted plastic material, and solid plastic.

24. Apparatus according to claim 16 including a belt passing through said treating chamber parallel to one pair of said electrodes, said belt being formed of netted dielectric material.

25. Apparatus according to claim 24 in which said belt is formed with a solid relatively thick longitudinally extending central portion of dielectric material.

26. Apparatus according to claim 16 in which each said electrode comprises a plate of dielectric material and a coating thereon of conductive material.

References Cited
UNITED STATES PATENTS

| | | | |
|---|---|---|---|
| 1,125,077 | 1/1915 | Dunlop | 317—22 |
| 2,810,933 | 10/1957 | Pierce et al. | 250—49.5 |
| 2,821,697 | 1/1958 | Minks | 340—250 |
| 2,844,731 | 7/1958 | Plonsky et al. | 250—49.5 |
| 2,894,139 | 7/1959 | Magruder et al. | 250—49.5 |
| 3,021,275 | 2/1962 | Sestini | 204—312 |
| 3,113,208 | 12/1963 | Traver | 250—49.5 |
| 3,135,679 | 6/1964 | Rothacker | 204—312 |

WILLIAM F. LINDQUIST, *Primary Examiner.*

U.S. Cl. X.R.

204—168, 323; 250—52